United States Patent
Yanaka et al.

(10) Patent No.: US 11,946,292 B2
(45) Date of Patent: Apr. 2, 2024

(54) SIDE DOOR FOR VEHICLE

(71) Applicant: TOYOTA JIDOSHA KABUSHIKI KAISHA, Toyota (JP)

(72) Inventors: Akihiro Yanaka, Nagoya (JP); Shinji Kurachi, Kariya (JP); Takanori Komatsu, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 272 days.

(21) Appl. No.: 17/518,126

(22) Filed: Nov. 3, 2021

(65) Prior Publication Data

US 2022/0162888 A1    May 26, 2022

(30) Foreign Application Priority Data

Nov. 24, 2020 (JP) .................................. 2020-194173

(51) Int. Cl.
  *B60J 5/04* (2006.01)
  *E05B 79/06* (2014.01)
  *E05B 85/18* (2014.01)

(52) U.S. Cl.
  CPC ............. *E05B 79/06* (2013.01); *B60J 5/0468* (2013.01); *E05B 85/18* (2013.01)

(58) Field of Classification Search
  CPC .......... E05B 79/06; E05B 85/18; B60J 5/0468
  See application file for complete search history.

(56) References Cited

U.S. PATENT DOCUMENTS

| | | | | |
|---|---|---|---|---|
| 5,340,174 A | * | 8/1994 | Bender | E05B 79/06 292/DIG. 31 |
| 5,377,450 A | * | 1/1995 | Varajon | E05B 85/12 296/146.7 |
| 6,209,366 B1 | * | 4/2001 | Zagoroff | E05B 77/44 292/DIG. 3 |
| 2003/0001399 A1 | * | 1/2003 | Sato | E05B 79/06 292/336.3 |
| 2007/0001479 A1 | * | 1/2007 | Fukuda | E05B 85/16 296/1.08 |
| 2011/0308172 A1 | * | 12/2011 | Schidan | E05B 79/06 49/506 |
| 2013/0263518 A1 | * | 10/2013 | Meyers | E05B 85/12 49/502 |
| 2019/0160921 A1 | | 5/2019 | Migaki et al. | |
| 2020/0232260 A1 | * | 7/2020 | Schmitz | E05B 79/04 |

FOREIGN PATENT DOCUMENTS

| | | | | |
|---|---|---|---|---|
| DE | 102019101293 A1 | * | 7/2020 | ............ B60J 5/0416 |
| JP | 57-168663 U | | 10/1982 | |
| JP | 05-214852 A | | 8/1993 | |
| JP | 2007-177475 A | | 7/2007 | |
| JP | 2013-163441 A | | 8/2013 | |
| JP | 2018-001858 A | | 1/2018 | |
| JP | 2019-098888 A | | 6/2019 | |

* cited by examiner

Primary Examiner — Marcus Menezes
(74) Attorney, Agent, or Firm — Dinsmore & Shohl LLP

(57) ABSTRACT

A side door disclosed herein is a side door for a vehicle, and includes an inner panel, a door handle attached to the inner panel and operable by a user, an outer panel covering the inner panel from an outer side of the vehicle and having an opening that exposes the door handle, and a cover attached to the inner panel and at least partially closing the opening of the outer panel. A projection is provided in the cover to project into a space between the door handle and the outer panel at least in a vehicle front-rear direction across the door handle.

5 Claims, 4 Drawing Sheets

SIDE DOOR FOR VEHICLE

CROSS-REFERENCE TO RELATED APPLICATION

This application claims priority to Japanese Patent Application No. 2020-194173 filed on Nov. 24, 2020, incorporated herein by reference in its entirety.

BACKGROUND

1. Technical Field

The technology disclosed herein relates to a side door provided on a side of a vehicle.

2. Description of Related Art

Japanese Unexamined Patent Application Publication No. 2018-1858 (JP 2018-1858 A) discloses a side door for a vehicle. The side door includes an inner panel, a door handle attached to the inner panel and operable by a user, and an outer panel covering the inner panel from an outer side of the vehicle and having an opening that exposes the door handle. The material for the inner panel is a metal. The material for the outer panel is a resin.

SUMMARY

When a vehicle traveling on a road undergoes collision in a vehicle front-rear direction (that is, front-end collision or rear-end collision), a side door may be deformed by a collision load. When an inner panel and an outer panel are made of different kinds of material as in the side door described above, the panels may deform differently. In particular, the outer panel made of a resin has such a characteristic that its elastic region is wider than that of the inner panel made of a metal. Therefore, when the side door is deformed by the collision load, the inner panel may plastically be deformed irreversibly, and the outer panel may restore the original shape (or shape close to the original shape) without undergoing significant plastic deformation. In this case, a significant relative displacement may occur between the door handle attached to the inner panel and the opening of the outer panel that exposes the door handle. As a result, the edge of the opening of the outer panel may be in contact with the door handle unexpectedly. Therefore, the door handle may be operated erroneously, for example.

The phenomenon described above may occur similarly in a side door with inner and outer panels that are made of the same material. That is, even in a case where the panels are made of the same material, if the panels, for example, have different shapes or structures, the panels may be deformed differently in the event of collision of the vehicle. As a result, the edge of the opening of the outer panel may be in contact with the door handle unexpectedly. Therefore, the door handle may be operated erroneously, for example.

In view of the circumstances described above, the present disclosure provides a technology capable of suppressing contact of an outer panel with a door handle in the event of collision of a vehicle.

One aspect of the present disclosure is embodied in a side door for a vehicle. The side door includes an inner panel, a door handle attached to the inner panel and operable by a user, an outer panel covering the inner panel from an outer side of the vehicle and having an opening that exposes the door handle, and a cover attached to the inner panel and at least partially closing the opening of the outer panel. A projection is provided in the cover to project into a space between the door handle and the outer panel at least in a vehicle front rear direction across the door handle.

In the side door described above, the cover is attached to the inner panel. The cover partially closes the opening of the outer panel. The cover includes the projection. The projection projects into the space between the door handle and the outer panel in the vehicle front-rear direction across the door handle. According to this structure, even when the vehicle undergoes front-end collision or rear-end collision and the inner panel and the outer panel are deformed differently, the projection of the cover can restrict movement of the opening of the outer panel toward the door handle. Thus, contact of an edge of the opening of the outer panel with the door handle is suppressed. For example, an unexpected erroneous operation of the door handle is restricted.

In the side door for the vehicle, the projection of the cover may extend along an edge of the opening of the outer panel.

In the side door for the vehicle, the projection of the cover may extend over an entire periphery of the opening of the outer panel.

In the side door for the vehicle, a plurality of fixing portions fixed to the inner panel by using fasteners, and a protrusion engaging with the inner panel may be further provided in the cover. The fixing portions may be provided along an outer edge of the cover. The protrusion may be positioned within an area surrounded by the fixing portions.

In the side door for the vehicle, two cover openings and a bridge extending between the two cover openings may be further provided in the cover. The door handle may be attached to the inner panel through the two openings of the cover. The protrusion of the cover may be provided on the bridge.

In the side door for the vehicle, a slope on a side of the projection that faces the outer panel may further be provided in the cover. The slope may be inclined towards the outer side of the vehicle in a direction from the outer panel to the door handle.

In the side door for the vehicle, an elastic region of a material for the outer panel and an elastic region of a material for the inner panel may differ from each other.

In the side door for the vehicle, the material for the inner panel may be a metal, and the material for the outer panel may be a resin.

In the side door for the vehicle, a position of a rear end of the inner panel and a position of a rear end of the outer panel in the vehicle front-rear direction may differ from each other.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Figure 1:
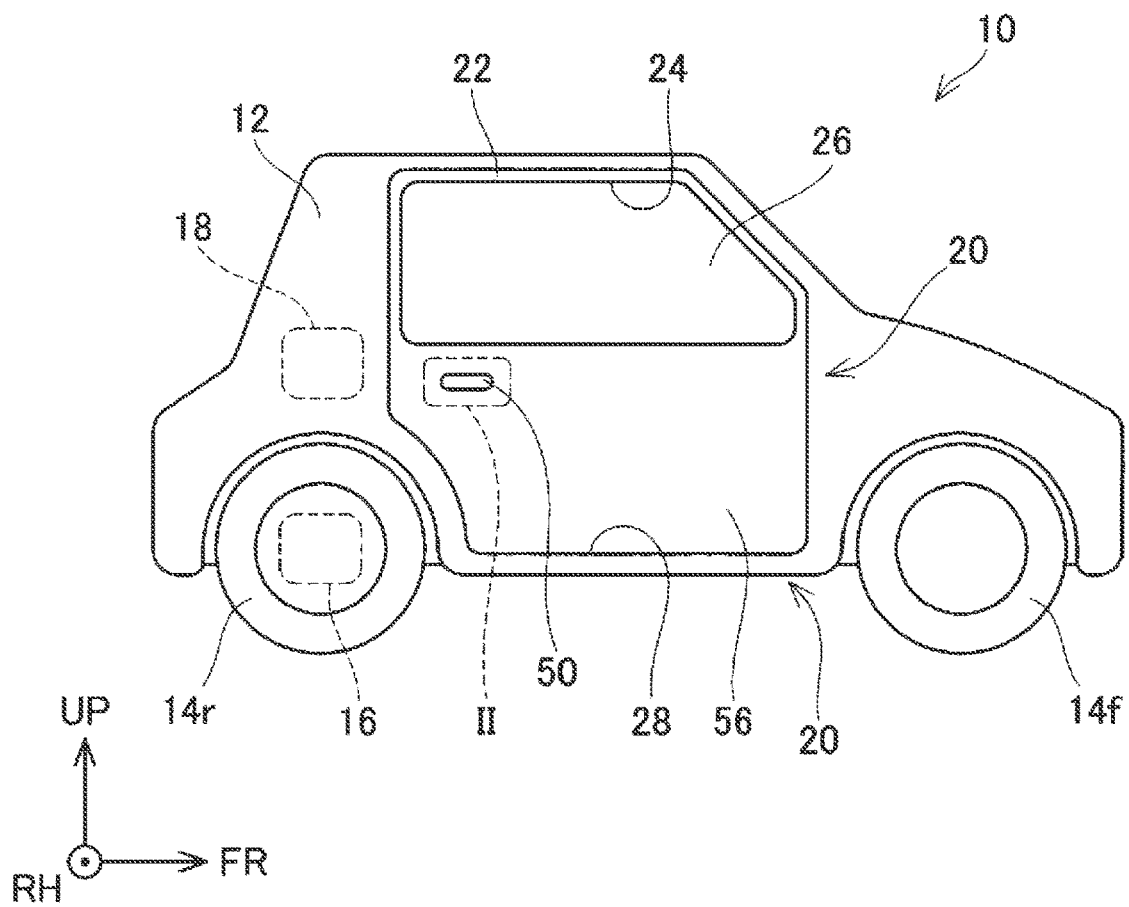
FIG. 1 is a side view schematically illustrating an overall vehicle 10, and mainly illustrating a right side of the vehicle 10 in its front-rear direction.

In one embodiment of this technology, a projection of a cover may be formed along an edge of an opening of an outer panel. That is, the projection may extend along the edge of the opening. According to this structure, movement of the opening of the outer panel toward a door handle can be suppressed more effectively.

In one embodiment of this technology, the projection of the cover may extend over an entire periphery of the opening of the outer panel. According to this structure, the rigidity of the cover including the projection can relatively be increased. Thus, even if the opening of the outer panel moves toward the door handle due to a higher collision load, the movement can be restricted.

In one embodiment of this technology, a plurality of fixing portions fixed to an inner panel by using fasteners, and a protrusion engaging with the inner panel may be further provided in the cover. The fixing portions may be provided along an outer edge of the cover. The protrusion may be positioned within an area surrounded by the fixing portions. According to this structure, the cover engages with the inner panel at the protrusion in addition to the fixing portions using the fasteners. Thus, the cover can firmly be attached to the inner panel without increasing the number of necessary fasteners.

In one embodiment of this technology, two cover openings and a bridge extending between the two cover openings may be further provided in the cover. The door handle may be attached to the inner panel through the two openings of the cover. The protrusion of the cover may be provided on the bridge. According to this structure, the protrusion is provided relatively near the door handle attached to the inner panel through the cover openings. Thus, the cover can be attached to the inner panel more firmly.

In one embodiment of this technology, a slope on a side of the projection that faces the outer panel may be further provided in the cover. The slope may be inclined towards an outer side of a vehicle in a direction from the outer panel to the door handle. According to this structure, when the opening of the outer panel moves toward the door handle due to the collision load, the opening of the outer panel is guided to the outer side of the vehicle along the slope. Therefore, even if the edge of the opening of the outer panel goes beyond the projection, contact of the edge with the door handle can be suppressed.

In one embodiment of this technology, an elastic region of a material for the outer panel and an elastic region of a material for the inner panel may differ from each other. When the inner panel and the outer panel are made of different kinds of material and the elastic regions of the materials differ from each other, the panels may be deformed differently irrespective of a difference in the shapes or structures of the panels. In view of this, this technology can suitably be employed in this structure.

In one embodiment of this technology, the material for the inner panel may be a metal, and the material for the outer panel may be a resin. However, the materials for the panels are not limited to a combination of the metal and the resin, and may be, for example, a combination of different resins.

In one embodiment of this technology, a position of a rear end of the inner panel and a position of a rear end of the outer panel in a vehicle front-rear direction may differ from each other. When the positions of the rear ends of the two panels differ from each other, the panels are likely to be deformed differently in the event of deformation of a side door due to a collision load from a rear in the vehicle front-rear direction. For example, when the rear end of the inner panel is positioned behind the rear end of the outer panel in the vehicle front-rear direction, the inner panel may be deformed more greatly because the inner panel starts to be deformed first. This technology can suitably be employed in this structure.

A side door 20 of this embodiment is described with reference to the drawings. The side door 20 can be employed in a vehicle 10. The vehicle 10 of this embodiment is a so-called automobile that travels on a road.

In the drawings, a direction FR indicates front in a vehicle front-rear direction, a direction RH indicates right in a width direction of the vehicle, and a direction UP indicates top in a vertical direction of the vehicle. In the present disclosure, an axis in the vehicle front-rear direction may be referred to simply as "longitudinal axis". The vehicle front-rear direction may be referred to simply as "front-rear direction". The vertical direction of the vehicle may be referred to simply as "vertical direction". The width direction of the vehicle may be referred to simply as "width direction".

As illustrated in FIG. 1, the vehicle 10 includes a vehicle body 12 and a plurality of wheels. The vehicle body 12 is not particularly limited, but is made of a metal material and a resin material. The wheels are rotatably attached to the vehicle body 12. The wheels include a pair of front wheels 14*f* and a pair of rear wheels 14*r*. The number of wheels is not limited to four. The vehicle 10 of this embodiment has a small size for two occupants, but the size of the vehicle 10 and the number of occupants are not particularly limited.

The vehicle 10 further includes a traveling motor 16 and a battery unit 18. The traveling motor 16 is connected to the rear wheels 14*r* to drive the rear wheels 14*r*. The traveling motor 16 may drive not only the rear wheels 14*r* but at least one of the wheels. The battery unit 18 is connected to the traveling motor 16 via a power supply circuit (not illustrated) to supply electric power to the traveling motor 16. The battery unit 18 includes a plurality of secondary battery cells, and is rechargeable with external electric power. In addition to or in place of the battery unit 18, the vehicle 10 may include another power supply such as a fuel cell unit or a solar panel. In addition to or in place of the traveling motor 16, the vehicle 10 may include another prime mover such as an engine.

The vehicle 10 further includes the side door 20. The side door 20 is provided on the vehicle body 12 in an openable and closable manner. The side door 20 is provided for a user to get into or out of the vehicle 10. The side door 20 is attached to the vehicle body 12 via a hinge (not illustrated), and is swingable in a horizontal direction. A window frame 22 is attached to the side door 20. The window frame 22 is positioned at an upper part of the side door 20. The window frame 22 defines a window opening 24. A window glass 26 is provided in the window opening 24. The window glass 26 is openable and closable, and is movable in the vertical direction along the window opening 24.

Figure 2:
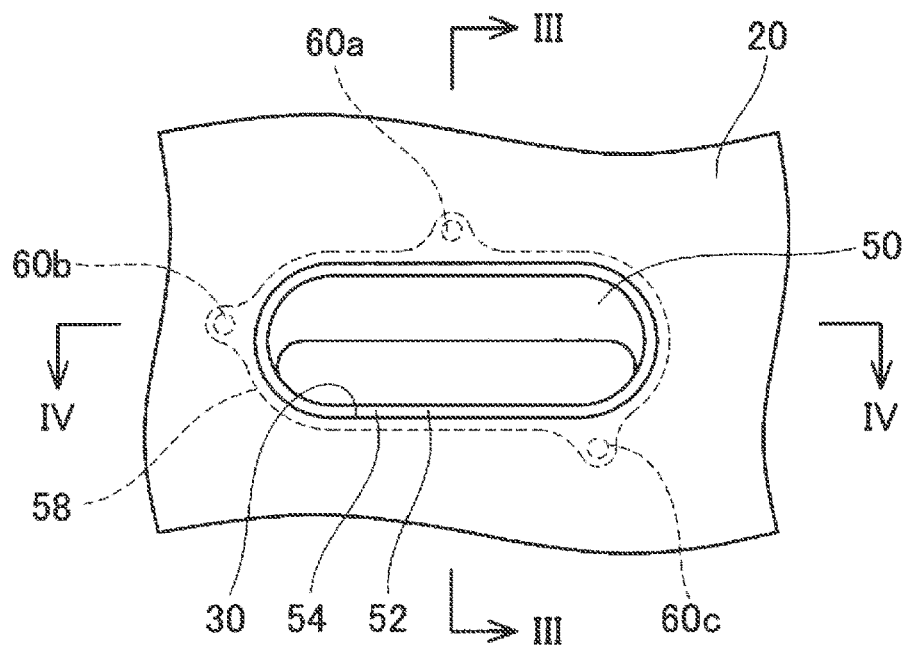
FIG. 2 is an enlarged view of a part enclosed by a dashed line II in FIG. 1.

As illustrated in FIG. 1 and FIG. 2, the side door 20 further includes a door handle 50. The door handle 50 is connected to an inner panel 58 described later. The door handle 50 is operated by the user to open or close the side door 20 relative to a door opening 28 of the vehicle body 12.

The door handle 50 is provided such that the door handle 50 is exposed to an outer side of the vehicle 10 in the width direction. The door handle 50 extends in the front-rear direction. The door handle 50 is pivotable about an axis along the front-rear direction. A specific structure of the door handle 50 is described later.

Figure 3:
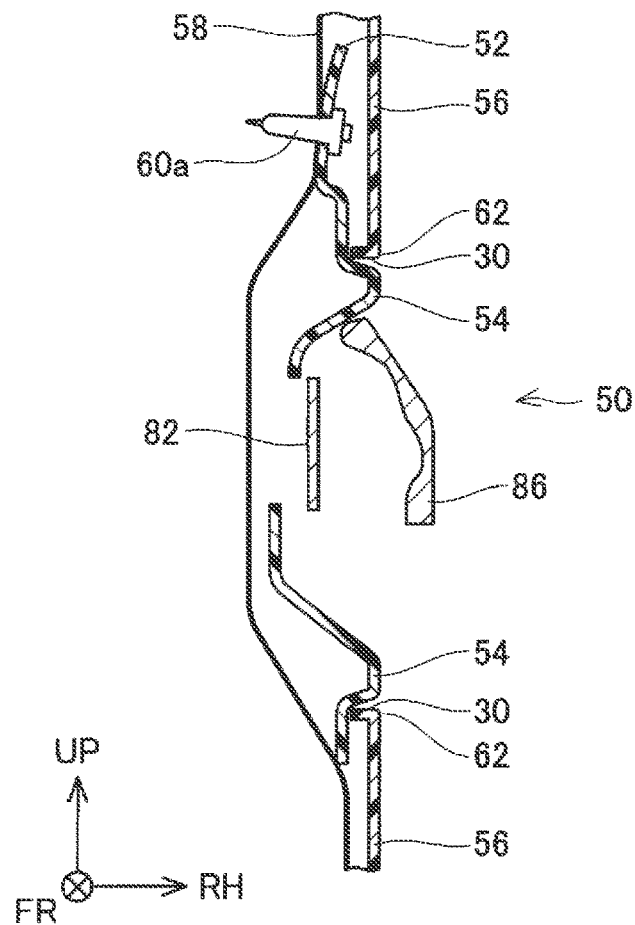
FIG. 3 is a sectional view taken along a line in FIG. 2, illustrating the structure of a cover 52.
Figure 4:
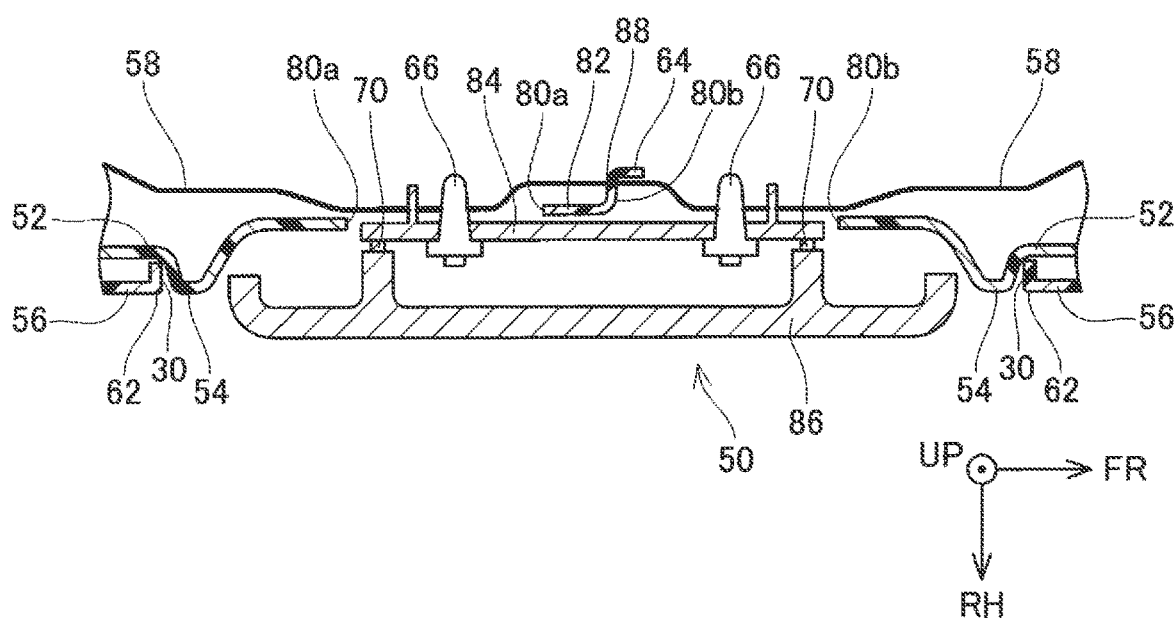
FIG. 4 is a sectional view taken along a line IV-IV in FIG. 2, illustrating the structure of the cover 52, in particular, the structure of a protrusion 64 provided at a bridge 82.

The structure of the side door 20, in particular, the structure related to the door handle 50 is described with reference to FIG. 2 to FIG. 5. As illustrated in FIG. 3 and FIG. 4, the side door 20 further includes an outer panel 56 and the inner panel 58. The inner panel 58 is positioned on an inner side of the vehicle 10 in the width direction. The outer panel 56 is positioned on an outer side in the width direction, and covers the inner panel 58 from the outer side in the width direction. The inner panel 58 and the outer panel 56 extend in the vertical direction and the front-rear direction. The inner panel 58 and the outer panel 56 are joined together at their front ends and rear ends. The inner panel 58 is made of a metal such as steel or aluminum. In another embodiment, the inner panel 58 may be made of a resin.

The door handle 50 is described here. As described above, the door handle 50 is connected to the inner panel 58. As illustrated in FIG. 4, the door handle 50 includes an attachment portion 84, a plurality of bolts 66, a handle lever 86, and a plurality of hinges 70. The attachment portion 84 is a member extending in the front-rear direction and fixed to the inner panel 58 with the bolts 66. Both ends of the attachment portion 84 are connected to the handle lever 86 via the hinges 70. The handle lever 86 is pivotable about an axis along the front-rear direction of the vehicle 10 via the hinges 70.

As illustrated in FIG. 2 to FIG. 4, the outer panel 56 has an opening 30. The opening 30 is provided to face the door handle 50 that is connected to the inner panel 58, and exposes the door handle 50 to the outer side in the width direction. The outer panel 56 is made of a resin. The resin material for the outer panel 56 may include a filler such as glass fibers. In another embodiment, the outer panel 56 may be made of a metal.

Figure 5:
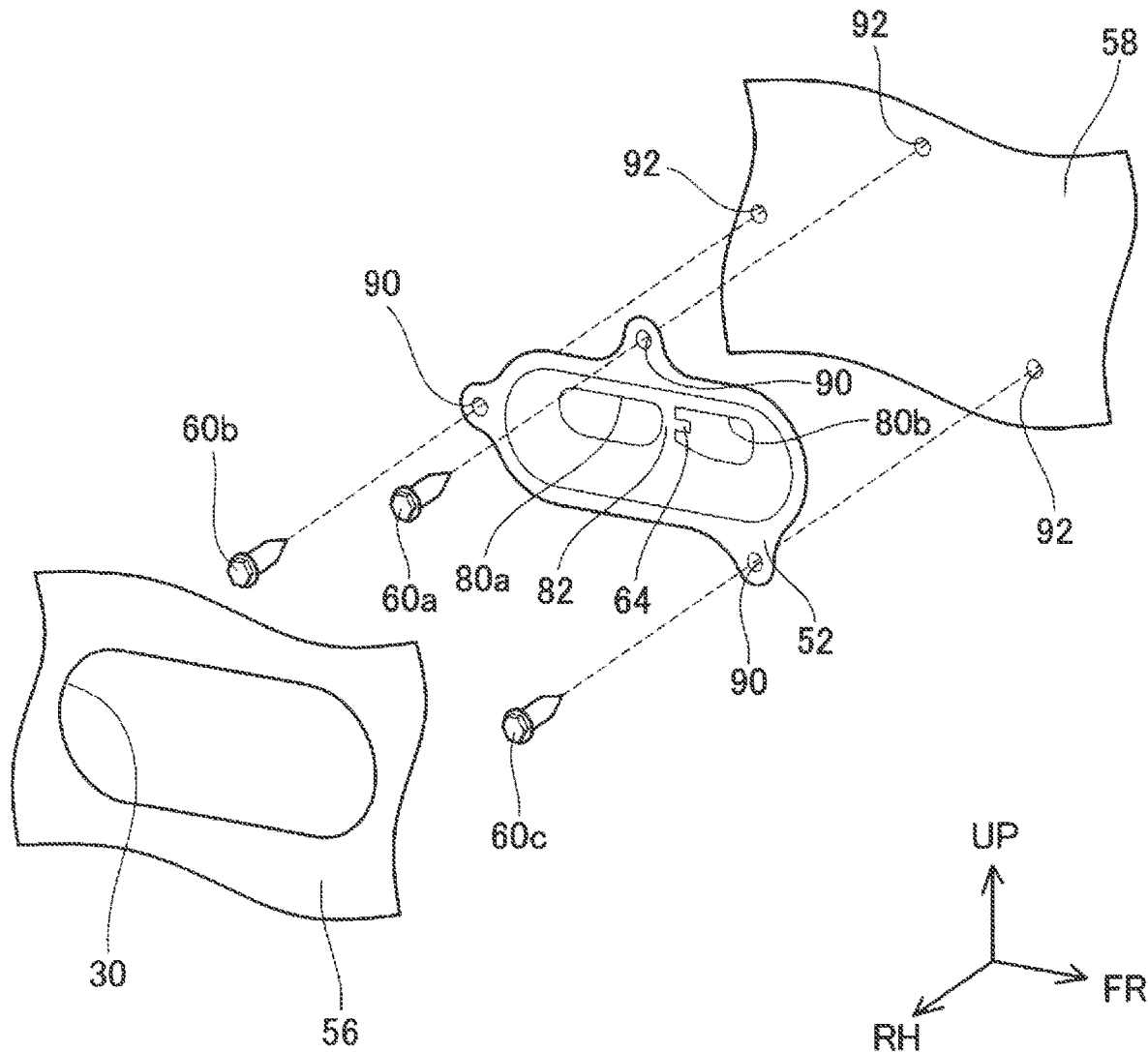
FIG. 5 is an exploded enlarged view of an outer panel 56, the cover 52, and an inner panel 58.

As illustrated in FIG. 2, the vehicle 10 further includes a cover 52. As illustrated in FIG. 5, the cover 52 has a plurality of upper fixing holes 90, and the inner panel 58 has a plurality of lower fixing holes 92. The lower fixing holes 92 correspond to the upper fixing holes 90 respectively. A plurality of fasteners 60a, 60b, and 60c are inserted through the upper fixing holes 90 of the cover 52 and the corresponding lower fixing holes 92 of the inner panel 58 to couple the cover 52 and the inner panel 58. For example, the cover 52 is made of a resin.

As illustrated in FIG. 3 and FIG. 4, the cover 52 partially closes the opening 30 of the outer panel 56. The cover 52 has a projection 54. The projection 54 is integrated with the cover 52. The projection 54 projects into a space between the door handle 50 and the outer panel 56. According to this structure, when the vehicle 10 undergoes front-end collision or rear-end collision and the inner panel 58 and the outer panel 56 are deformed differently, the projection 54 can restrict movement of the opening 30 of the outer panel 56 toward the door handle 50. Specifically, when the opening 30 of the outer panel 56 is about to move toward the door handle 50, an edge 62 of the opening 30 comes into contact with a side of the projection 54 that faces the outer panel 56. For example, the outer panel 56 in contact with the side of the projection 54 is buckled. Thus, contact of the edge 62 of the opening 30 of the outer panel 56 with the door handle 50 is suppressed. As a result, an unexpected erroneous operation on the door handle 50 is restricted, for example.

The projection 54 of the cover 52 of this embodiment extends along the edge 62 of the opening 30 of the outer panel 56 over the entire periphery of the opening 30. Therefore, the rigidity of the cover 52 is relatively increased. Thus, even if the opening 30 of the outer panel 56 moves toward the door handle 50 due to a higher collision load, the movement can be restricted.

The specific structure of the projection 54 may be modified variously. For example, the projection 54 only needs to be provided at least in the front-rear direction across the door handle 50 to project into the space between the door handle 50 and the outer panel 56. The shape and size of the projection 54 and the number of projections 54 are not particularly limited. In another embodiment, the projection 54 may be shaped into a plate that partially projects into the space between the door handle 50 and the outer panel 56 along the edge 62 of the opening 30 of the outer panel 56 on each side in the front-rear direction across the door handle 50. In this case, two projections 54 are provided at the front and rear across the door handle 50. In this structure as well, when the vehicle 10 undergoes front-end collision or rear-end collision, the projection 54 can suppress the movement of the opening 30 of the outer panel 56 toward the door handle 50.

As illustrated in FIG. 5, the cover 52 of this embodiment includes a bridge 82 and a protrusion 64. The bridge 82 extends from top to bottom in the cover 52, and defines two cover openings 80a and 80b. As illustrated in FIG. 4, the door handle 50 is attached to the inner panel 58 with the bolts 66 through the cover openings 80a and 80b. The protrusion 64 is provided on the bridge 82. The protrusion 64 has a bending structure to bend in a direction parallel to the longitudinal axis through a hole 88 in the inner panel 58. The protrusion 64 of the cover 52 is caught on the hole 88 of the inner panel 58 such that the cover 52 engages with the inner panel 58. Therefore, the cover 52 engages with the inner panel 58 at the protrusion 64 in addition to the fixing portions using the fasteners 60a, 60b, and 60c. Thus, the cover 52 can firmly be attached to the inner panel 58 without increasing the number of necessary fasteners. The protrusion 64 may also be provided at any part within an area surrounded by the fixing portions in the cover 52 instead of the bridge 82 unlike this embodiment.

As described above, the door handle 50 is attached to the inner panel 58 through the two cover openings 80a and 80b in the cover. That is, the protrusion 64 is provided at a position relatively near the door handle 50 attached to the inner panel 58 through the cover openings 80a and 80b. Thus, the cover 52 can be attached to the inner panel 58 more firmly.

Figure 6:
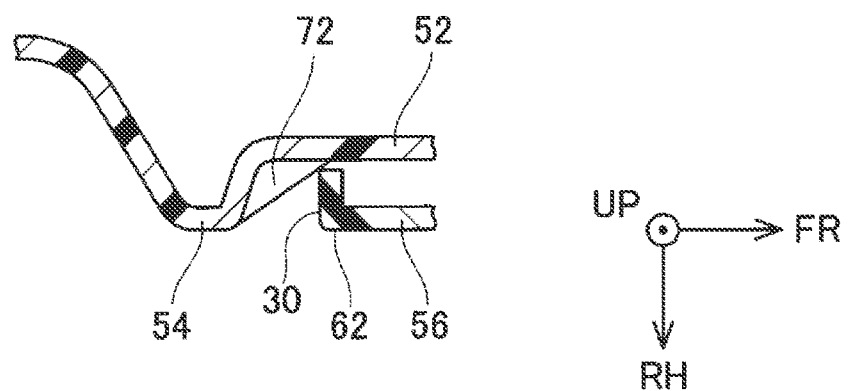
FIG. 6 illustrates the structure of a slope 72.

As illustrated in FIG. 6, the cover 52 of this embodiment may further include a slope 72 on the side of the projection 54 that faces the outer panel 56. The slope 72 is inclined towards the outer side of the vehicle 10 in a direction from the outer panel 56 to the door handle 50. According to this structure, when the opening 30 of the outer panel 56 moves toward the door handle 50 due to the collision load, the opening 30 is guided to the outer side of the vehicle 10 along the slope 72. Therefore, even if the edge 62 of the opening 30 of the outer panel 56 goes beyond the projection 54, contact of the edge 62 with the door handle 50 can be suppressed. When the projection 54 extends over the entire periphery of the opening 30 of the outer panel 56 as in this embodiment, the slope 72 is provided annularly in the end face of the projection 54.

The technology described in this embodiment can similarly be employed in a case where elastic regions of the material for the outer panel 56 and the material for the inner panel 58 differ from each other. When the inner panel 58 and the outer panel 56 are made of different kinds of material and the elastic regions of the materials differ from each other, the panels are likely to be deformed differently irrespective of a difference in the shapes or structures of the panels. In view of this, the technology described in this embodiment can be employed particularly suitably in the case where the elastic region of the material for the outer panel 56 and the elastic region of the material for the inner panel 58 differ from each other.

Figure 7:
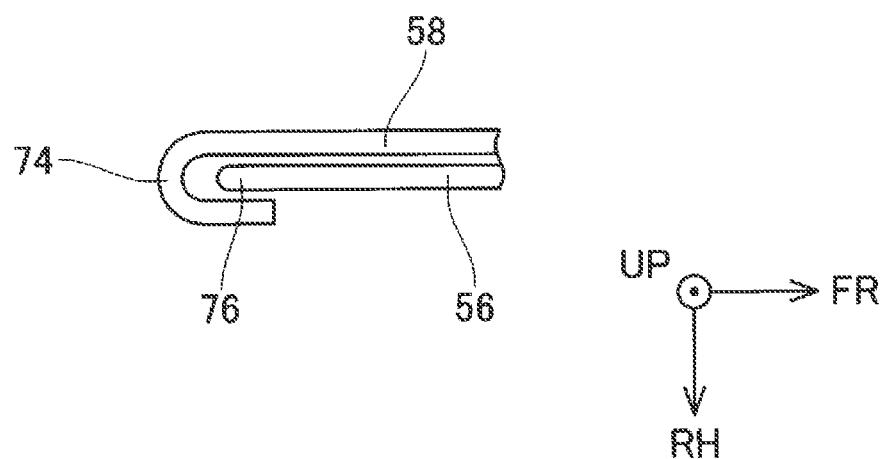
FIG. 7 schematically illustrates a rear end 76 of the outer panel 56 and a rear end 74 of the inner panel 58.

The technology described herein can similarly be employed in a case where the positions of the rear end of the inner panel 58 and the rear end of the outer panel 56 in the front-rear direction of the vehicle 10 differ from each other. When the positions of the rear ends of the two panels differ from each other, the panels are likely to be deformed differently in the event of deformation of the side door 20 due to a collision load from the rear. For example, when the tip of a rear end 76 of the outer panel 56 is positioned behind the tip of a rear end 74 of the inner panel 58 as illustrated in FIG. 7 (that is, the rear end 74 of the inner panel 58 is bent so that the tip of the rear end 76 of the outer panel 56 is positioned behind the tip of the rear end 74 of the inner panel 58), the inner panel 58 is likely to be deformed more greatly because the inner panel 58 starts to be deformed first. In view of this, the technology described in this embodiment can be employed particularly suitably in the case where the positions of the rear end 74 of the inner panel 58 and the rear end 76 of the outer panel 56 in the longitudinal direction differ from each other.

Although some specific examples are described above in detail, the examples are only illustrative and are not intended to limit the claims. The technologies described in the claims encompass various modifications and changes to the specific examples described above. The technical elements disclosed herein or illustrated in the drawings exert technical utility solely or in combination.

What is claimed is:

1. A side door for a vehicle, the side door comprising:
    an inner panel;
    a door handle attached to the inner panel and operable by a user;
    an outer panel covering the inner panel from an outer side of the vehicle and having an opening that exposes the door handle; and
    a cover attached to the inner panel and at least partially closing the opening of the outer panel; wherein:
    a projection is provided in the cover to project into a space between the door handle and the outer panel at least in a vehicle front-rear direction across the door handle;
    a plurality of fixing portions fixed to the inner panel by using fasteners, and a protrusion engaging with the inner panel are further provided in the cover;
    the fixing portions are provided along an outer edge of the cover;
    the protrusion is positioned within an area surrounded by the fixing portions;
    two cover openings and a bridge extending between the two cover openings are further provided in the cover;
    the door handle is attached to the inner panel through the two cover openings of the cover; and
    the protrusion of the cover is provided on the bridge.

2. The side door according to claim 1, wherein the projection of the cover extends along an edge of the opening of the outer panel.

3. The side door according to claim 2, wherein the projection of the cover extends over an entire periphery of the opening of the outer panel.

4. The side door according to claim 1, wherein a slope on a side of the projection that faces the outer panel is further provided in the cover, the slope being inclined towards the outer side of the vehicle in a direction from the outer panel to the door handle.

5. The side door according to claim 1, wherein a position of a rear end of the inner panel and a position of a rear end of the outer panel in the vehicle front-rear direction differ from each other.

* * * * *